United States Patent
Fujioka et al.

(10) Patent No.: US 8,654,267 B2
(45) Date of Patent: Feb. 18, 2014

(54) DISPLAY DEVICE

(75) Inventors: Kazuyoshi Fujioka, Osaka (JP);
Atsuhito Murai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 190 days.

(21) Appl. No.: 13/322,138

(22) PCT Filed: Mar. 11, 2010

(86) PCT No.: PCT/JP2010/001736
§ 371 (c)(1),
(2), (4) Date: Nov. 28, 2011

(87) PCT Pub. No.: WO2010/137215
PCT Pub. Date: Dec. 2, 2010

(65) Prior Publication Data
US 2012/0069258 A1     Mar. 22, 2012

(30) Foreign Application Priority Data
May 27, 2009   (JP) ................................. 2009-127865

(51) Int. Cl.
*G02F 1/1335*     (2006.01)
(52) U.S. Cl.
USPC .......................................................... 349/12
(58) Field of Classification Search
USPC ..................................................... 349/8, 12
See application file for complete search history.

(56) References Cited

U.S. PATENT DOCUMENTS

| | | | |
|---|---|---|---|
| 2006/0017710 A1* | 1/2006 | Lee et al. | 345/173 |
| 2006/0097975 A1 | 5/2006 | Lee et al. | |
| 2008/0186288 A1* | 8/2008 | Chang | 345/174 |
| 2008/0252618 A1 | 10/2008 | Chung et al. | |

FOREIGN PATENT DOCUMENTS

| | | |
|---|---|---|
| JP | 9-80467 A | 3/1997 |
| JP | 2001-42296 A | 2/2001 |
| JP | 2006-133788 A | 5/2006 |
| JP | 2008-83677 A | 4/2008 |

* cited by examiner

*Primary Examiner* — Phu Vu
(74) *Attorney, Agent, or Firm* — Chen Yoshimura LLP

(57) ABSTRACT

Provided is a display device provided with a non-contact type touch sensor having excellent properties, in place of a contact-point type touch sensor. The display device includes a first circuit having a first electrode (62c) formed on a first substrate (2) having a display surface of a display panel, a field effect transistor formed on a second substrate (1) opposed to the first substrate (2) so that the first electrode (62c) is spaced from the field effect transistor on the back channel side, a gate terminal of the field effect transistor being connected to a first wiring (Vrstn) and a first drain/source terminal thereof being connected to a second wiring (Vsm), and a switch, one end of which is connected to a second drain/source terminal of the field effect transistor and the other end being connected to a third wiring (Vom).

11 Claims, 8 Drawing Sheets

(a)

(b)

(a)

(b)

DISPLAY DEVICE

TECHNICAL FIELD

The present invention relates to a display device having a touch sensor in a display region.

BACKGROUND ART

Liquid crystal display devices having a touch sensor in a picture unit or a pixel are known to public. As a sensing method for such liquid crystal display devices, three methods: a photo sensor method, a contact-point (touch) method, and a capacitance method have been put to practical use.

FIG. 10 shows a configuration example of a display region having a photo sensor type touch sensor.

The configuration of an "n"-th row in the display region of the liquid crystal display panel is extracted and shown in FIG. 10. Arranged in the "n"-th row are a plurality of picture units PIX . . . , which are partitioned by a gate wire Gn, a source wire S (Sm to Sm+3 are shown in the figure), and a storage capacitance wire Csn, and one or more sensor circuits 102 that are connected to a reset wire Vrstn and a read-out control wire Vrwn.

The picture unit PIX includes a TFT 101 as a switching element, a liquid crystal capacitance CL, and a storage capacitance CS. A gate of the TFT 101 is connected to the gate wire Gn, a source of the TFT 101 is connected to a source wire S, and a drain of the TFT 101 is connected to a picture unit electrode 103, respectively. The liquid crystal capacitance CL is a capacitance in which a liquid crystal layer is interposed between the picture unit electrode 103 and a common electrode "com." The storage capacitance CS is a capacitance in which an insulating film is interposed between the picture unit electrode 103 or the drain electrode of the TFT 101 and the storage capacitance wire Csn. A fixed voltage is applied to the common electrode "com" and the storage capacitance wire Csn, respectively, for example.

An appropriate number of the sensor circuits 102 are provided such as one sensor circuit 102 per a picture unit PIX or a pixel (a set of RGB picture units PIX . . . , for example), and the sensor circuit 102 includes an output amp 102a, a photo diode 102b, and a capacitance 102c. The output amp 102a is formed of a TFT. A gate of the output amp 102a is connected to an electrode called a node netA here, a drain of the output amp 102a is connected to one source wire Sm+1, and a source of the output amp 102a is connected to another source wire Sm, respectively. An anode of the photo diode 102b is connected to the reset wire Vrstn, and a cathode of the photo diode 102b is connected to the node netA, respectively. One end of the capacitance 102c is connected to the node netA, and the other end is connected to the read-out control wire Vrwn, respectively.

The sensor circuit 102 performs touch sensing by using a period outside the period for writing data signals to the picture units PIX in order to detect the existence of a shadow created when a fingertip approaches or touches the panel. After resetting a voltage of the node netA by a voltage of the reset wire Vrstn through the photo diode 102b, a voltage that appeared in the node netA according to the intensity of light received at the photo diode 102b is output from the source of the output amp 102a as a sensor output voltage Vo by using a voltage increase of the node netA due to the voltage variation of the read-out control wire Vrwn. The sensor output voltage Vo is output to a sensor read-out circuit outside the display region through a sensor output wire Vom, which uses the source wire Sm+1. Here, the output amp 102a functions as a source follower. Further, here, the source wire Sm connected to the drain of the output amp 102a functions as a sensor power supply wire Vsm, which is applied with a fixed voltage when detecting light.

Next, FIG. 11 shows a configuration example of a display region having a contact-point type touch sensor.

This is a configuration in which the sensor circuit 102 of FIG. 10 is replaced with a sensor circuit 202.

The sensor circuit 202 includes a read-out TFT 202a and a vertical electrode switch 202b. A gate of the read-out TFT 202a is connected to a read-out signal wire Vrdm, a drain of the read-out TFT 202a is connected to one of the electrodes of the vertical electrode switch 202b, and a source of the read-out TFT 202a is connected to the sensor output wire Vom, respectively. The other electrode of the vertical electrode switch 202b is constituted of the common electrode "com," and is applied with a voltage Vcom.

In the sensor circuit 202, when the panel is pressed by a fingertip, one electrode and the other electrode of the vertical electrode switch 202b come in contact with each other to form a contact point. Here, when the read-out TFT 202a is turned on by applying a voltage from the read-out signal wire Vrdm using a period outside the period for writing data signals to picture units PIX, the voltage Vcom is output to the sensor output wire Vom through the vertical electrode switch 202b and the read-out TFT 202a so that touch sensing can be performed.

Next, FIG. 12 shows a configuration example of a display region having a capacitance type touch sensor.

This is a configuration in which the sensor circuit 102 of FIG. 10 is replaced with a sensor circuit 302.

The sensor circuit 302 includes an output amp 302a, a photo diode 302b, and capacitances 302c and 302d. The output amp 302a is formed of a TFT. A gate of the output amp 302a is connected to an electrode called the node netA, a drain of the output amp 302a is connected to the source wire Sm, and a source of the output amp 302a is connected to the source wire Sm+1, respectively. An anode of the photo diode 302b is connected to the reset wire Vrstn, and a cathode of the photo diode 302b is connected to the node netA, respectively. One end of the capacitance 302c is connected to the node netA, and the other end is connected the read-out control wire Vrwn. One end of the capacitance 302d is connected to the node netA, and the other end is constituted of the common electrode "com."

The sensor circuit 302 performs touch sensing by detecting a change in a capacitance value Ccvr of the capacitance 302d due to a pressing force applied on the panel by a fingertip by using a period outside the period for writing data signals to picture units PIX. The photo diode 302b is provided to drive the sensor circuit 302 as a photo sensor circuit in a manner similar to the sensor circuit 102, but its diode characteristic is used when driving the sensor circuit 302 as a touch sensor circuit. After a voltage of the node netA is reset through the photo diode 302b, a voltage of the read-out control wire Vrwn is changed, and as a result, the voltage of the node netA becomes a value in accordance with the capacitance 302c and the capacitance value Ccvr of the capacitance 302d determined by an applied pressing force, and therefore, a voltage appeared in the node netA is output from the source of the output amp 302a as a sensor output voltage Vo, and is output to a sensor read-out circuit outside the display region through the sensor output wire Vom, which uses the source wire Sm+1. Here, the output amp 302a functions as a source follower. Here, the source wire Sm functions as a sensor power supply wire Vsm, which is applied with a fixed voltage.

Next, among the touch sensors described above, a touch sensor with a contact-point method configuration disclosed in Patent Document 1 is shown in FIG. 13.

FIG. 13 is a cross-sectional view of a liquid crystal display device when a finger of a user or the like is in contact therewith. The liquid crystal display device is configured such that a liquid crystal layer 3 is interposed between a bottom display plate 100 and a top display plate 200. In the bottom display plate 100, a pixel layer 115 is formed on an insulating substrate 110. A pixel, a sensing part, and the like are formed in the pixel layer 115, and input terminal electrodes 196 of a sensing element of a contact sensing part are exposed over the pixel layer 115.

In the top display plate 200, light-shielding members 220 are formed on a substrate 210. The light-shielding members 220 prevent light leakage from an area between respective pixels. A plurality of color filters 230 are formed on the substrate 210 and the light-shielding members 220. A cover film 250 is formed on the color filters 230 and the light-shielding members 220 to cover the color filters 230 and to planarize the surface. On the cover film 250, a plurality of projections 240, which are made of an organic material or the like, are formed. The projections 240 are formed corresponding to the positions in which the input terminal electrodes 196 of a sensing element are formed. A common electrode 270 is formed on the cover film 250 and the projections 240. The two display plates 100 and 200 are supported by a plurality of bead spacers 320, and a certain distance of the range of 0.1 μm to 1.0 μm is maintained between the common electrode 270, which surrounds the projections 240, and the input terminal electrodes 196.

The common electrode 270, which surrounds the projections 240, and the input terminal electrodes 196 constitute a switch of the contact sensing part.

The top display plate 200 is pressed by a contacting pressure, and the common electrode 270 surrounding the projections 240 of the contacted position becomes electrically and physically connected to the input terminal electrodes 196 of the bottom display plate 100. As a result, a common voltage Vcom is transmitted to the input terminal electrodes 196, and the sensing element supplies a sensing current.

RELATED ART DOCUMENTS

Patent Documents

Patent Document 1: Japanese Patent Application Laid-Open Publication No. 2006-133788 (Published on May 25, 2006)

Patent Document 2: Japanese Patent Application Laid-Open Publication No. 2001-42296 (Published on Feb. 16, 2001)

SUMMARY OF THE INVENTION

Problems to be Solved by the Invention

However, in the liquid crystal display device having a contact-point type touch sensor of the above-mentioned Patent Document 1, the common electrode 270 and the input terminal electrodes 196, which are electrodes of the contact sensing part, are facing the liquid crystal layer, and therefore, an alignment film formed in the manufacturing process is also formed on the outermost surface of the electrodes. Because an alignment film is made of a dielectric body and is non-conductive, it is difficult to achieve an electrically stable connection between the electrodes.

Accordingly, in order to achieve a stable electrical connection between the electrodes when performing touch sensing, a strong pressing force at such a strength as to break through the alignment film needs to be applied on the panel.

As a result, the alignment film is peeled off when the electrodes come in contact with each other, and thereby causes a problem of having pieces of the alignment film floating in the liquid crystal layer to become a pixel defect. In order to prevent this pixel defect, a process to remove the alignment film on the electrodes would be necessary, which is inconvenient.

Even though a photo sensor type touch sensor is used in order to avoid such a contact problem, a photo diode has a characteristic in which an ON current is saturated under the illuminance of over a certain degree such as 100lx or higher, and therefore, if direct sunlight enters at the illuminance of 50000lx to 100000lx, and the light is diffracted from the surroundings of a fingertip, the illuminance of the detected area is not sufficiently lowered compared to the surroundings, and an ON current of the photo diode is saturated in a manner similar to the surrounding area. Therefore, an area where a fingertip contacts or an area where a fingertip approaches cannot be detected.

On the other hand, in a low illuminance environment of approximately several hundred lx, a sensor circuit responds to a shadow created by an object other than a fingertip, and thereby causing a malfunction.

Thus, a malfunction occurs in a photo sensor circuit in a high illuminance environment and a low illuminance environment, and therefore, a contact-point type touch sensor cannot be replaced unconditionally.

Moreover, even though a capacitance type touch sensor is used in order to avoid the aforementioned contact problem, a problem remains that a malfunction is likely to occur due to an external cause such as temperature change and static electricity. This is due to the fact that detecting the amount of change is difficult in the first place because the capacitance of a liquid crystal layer for detecting a change in the capacitance value is small, such as about several pF. The liquid crystal capacitance changes according to temperature, and also changes due to static electricity and a field noise from a signal wire of the liquid crystal display device, and therefore, the amount of change in capacitance of a detection target becomes close to a noise level, and the detecting S/N ratio is lowered.

As described above, in the past, there has not been existed a liquid crystal display device having a non-contact point type touch sensor having excellent properties, which can avoid a problem of difficulty achieving a stable electrical connection between the respective electrodes in a contact-point type touch sensor.

The present invention was devised in light of the above-mentioned conventional problem, and its object is to achieve a display device including a non-contact type touch sensor having excellent properties, which can replace a contact-point type touch sensor.

Means for Solving the Problems

In order to resolve the above-mentioned problem, a display device of the present invention is equipped with a first circuit including:

a first electrode formed on a first substrate having a display surface of a display panel;

a field effect transistor formed on a second substrate opposed to the first substrate so that the first electrode is spaced from the field effect transistor on a back channel side, a gate terminal being connected to a first wiring, and a first drain/source terminal being connected to a second wiring; and a switch, one end of which is connected to a second drain/source terminal of the field effect transistor, and the other end is connected to a third wiring.

According to the above-mentioned invention, in a state where no pressing force is applied on the display surface of the first substrate, even when a certain voltage is applied to the first wiring, the first electrode remains in a position far from the second substrate. Here, the back gate effect on the field effect transistor by the first electrode is small, and it is possible to turn off the field effect transistor and to prevent leakage current from being generated in the back channel. Accordingly, even when the switch is turned on, a voltage of the second wiring is not transmitted to the third wiring.

Meanwhile, in a state where a pressing force is applied on the display surface of the first substrate, when the above-mentioned certain voltage is applied to the first wiring, the first electrode moves to a position near the second substrate. Here, the back gate effect by the first electrode is large, and it is possible to generate leakage current in the back channel of the field effect transistor. Thus, a voltage of a source of the field effect transistor is increased. Therefore, when a switch is turned on after the field effect transistor is sufficiently turned off, the voltage of the source of the field effect transistor is transmitted to the third wiring, that is, the voltage of the second wiring is transmitted to the third wiring.

As a result, the existence of an applied pressing force on the display surface can be detected by detecting the voltage transmitted to the third wiring.

According to the above-mentioned configuration of the first circuit, even though the first electrode does not come in electrical contact with the second substrate by a pressing force, detection signals according to the existence of the pressing force can be obtained. Because a movable electrical contact point is not necessary to detect a pressing force, there is no need to push with a strong force, and as a result, it is possible to avoid a peel-off of the inside of the sensor circuit. Therefore, a touch sensor circuit with superior durability is achieved.

Further, because a photo sensor is not used to detect a pressing force, unlike a photo sensor circuit, there is no problem such as a malfunction in a high illuminance environment and a low illuminance environment. Moreover, unlike a capacitance type touch sensor, there is no site in which a malfunction is likely to occur due to an external cause such as temperature change and static electricity, and therefore, detection with a high S/N ratio becomes possible.

As a result, it is possible to achieve a display device including a non-contact type touch sensor having excellent properties, which can replace a contact-point type touch sensor.

Further, because a current applied to the filed effect transistor can be set large, the element size of the field effect transistor and the switch can be reduced. Accordingly, a voltage for generating detection signals can be reduced while increasing the aperture ratio of the display region.

Also, unlike a photo sensor circuit, a large capacitance for voltage increase is not necessary, and therefore, the process is simplified and the aperture ratio of the display region can be increased.

Effects of the Invention

As described above, a display device of the present invention is equipped with a first circuit including:

a first electrode formed on a first substrate having a display surface of a display panel;

a field effect transistor formed on a second substrate opposed to the first substrate so that the first electrode is spaced from the field effect transistor on a back channel side, a gate terminal being connected to a first wiring, and a first drain/source terminal being connected to a second wiring; and a switch, one end of which is connected to a second drain/source terminal of the field effect transistor, and the other end is connected to a third wiring.

As a result, it is possible to achieve a display device including a non-contact type touch sensor having excellent properties, which can replace a contact-point type touch sensor.

DETAILED DESCRIPTION OF EMBODIMENTS

Embodiments of the present invention is described below using FIGS. 1 to 9.

Figure 9:
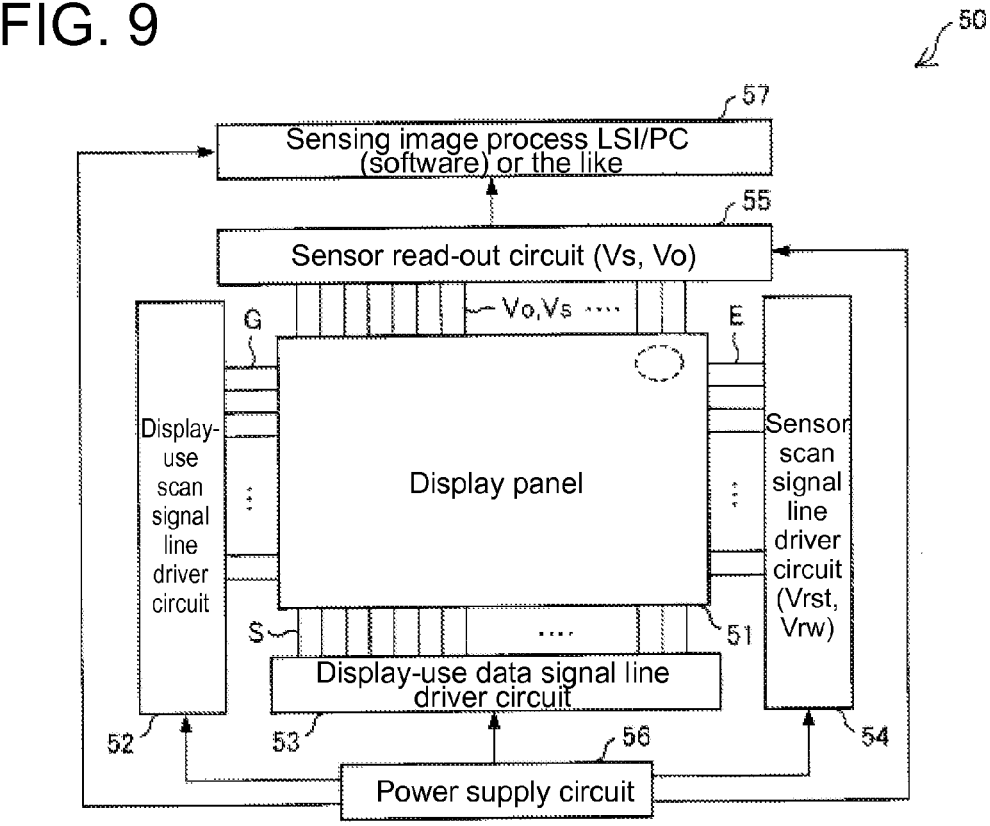
FIG. 9 shows an embodiment of the present invention, and is a block diagram showing the configuration of the display device.

FIG. 9 shows the configuration of a liquid crystal display device (display device) 50 of an embodiment of the present invention.

The liquid crystal display device 50 is an active matrix type display device, and includes a display panel 51, a display-use scan signal line driver circuit 52, a display-use data signal line driver circuit 53, a sensor scan signal line driver circuit 54, a sensor read-out circuit 55, a power supply circuit 56, and a sensing image process device 57.

The display panel 51 includes a plurality of gate wires G . . . and a plurality of source wires S . . . that are perpendicular to each other, and a display region in which picture units PIX, which are formed corresponding to an intersection of each gate wire G and each source wire S, are arranged in a matrix.

The display-use scan signal line driver circuit 52 drives the gate wires G . . . by sequentially outputting scan signals for selecting picture units PIX for writing data signals to each gate wire G. The display-use data signal line driver circuit 53 drives the source wires S . . . by outputting data signals to each source wire S. The sensor scan signal line driver circuit (a driver circuit of the first circuit) 54 drives sensor scan signal lines E . . . by sequentially outputting scan signals (voltage Vrst, voltage Vrd) for driving a sensor circuit to respective sensor scan signal lines E. The sensor read-out circuit 55 reads out a sensor output voltage Vo (the same character as the sensor output wire is used for convenience) from the respective sensor output wires (third wiring) Vo, and supplies a power supply voltage to a sensor power supply wire (second wiring) Vs. The power supply circuit 56 supplies power necessary to drive the display-use scan signal line driver circuit 52, the display-use data signal line driver circuit 53, the sensor scan signal line driver circuit 54, the sensor read-out circuit 55, and the sensing image process device 57. The sensing image process device 57 analyzes the distribution of the sensor detected results within the panel surface based on the sensor output voltages Vo, which have been read by the sensor read-out circuit 55.

The functions of the sensor scan signal line driver circuit 54 and the sensor read-out circuit 55 may be included in other circuits such as the display-use scan signal line driver circuit 52 and the display-use data signal line driver circuit 53, for example. Also, the function of the sensor read-out circuit 55 may be included in the sensing image process device 57. Further, the sensing image process device 57 may be included in the liquid crystal display device 50 as an LSI or a computer configuration, but it may also be located outside the liquid crystal display device 50. Similarly, the sensor read-out circuit 55 may be located outside the liquid crystal display device 50.

Figure 2:
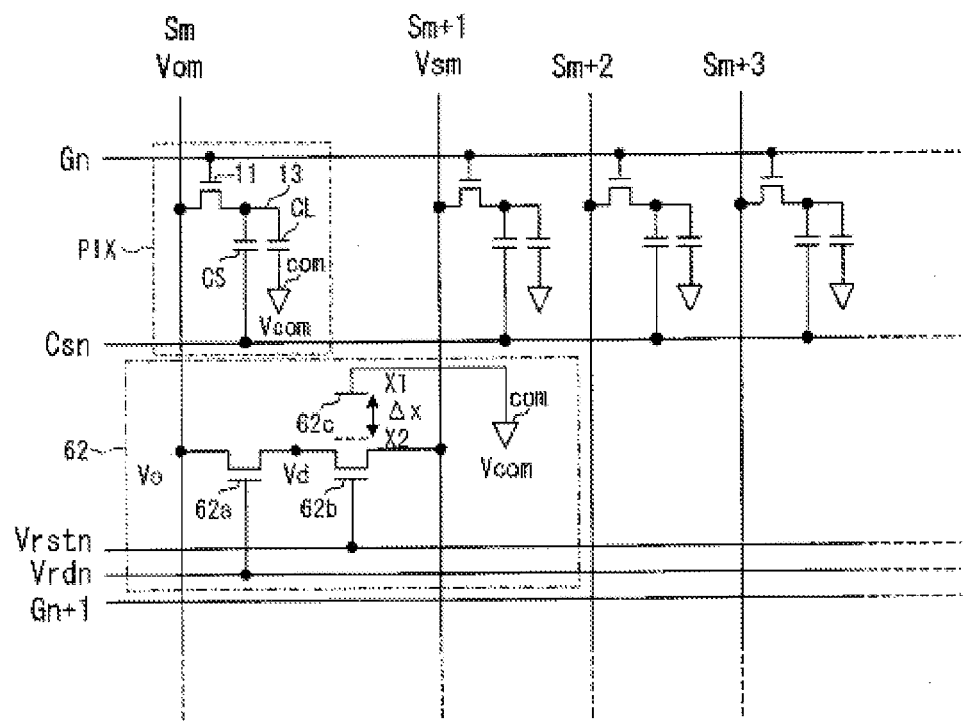
FIG. 2 shows an embodiment of the present invention, and is a circuit diagram showing the configuration of a display region of a display device.

Next, FIG. 2 shows a detailed configuration of the display region.

FIG. 2 shows the configuration of the n-th row of the display region. Disposed in the n-th row are a plurality of picture units PIX . . . partitioned by a gate wire Gn, source wires S (Sm to Sm+3 are shown in the figure), and a storage capacitance wire Csn, and at least one touch sensor circuits 62 connected to a reset wire (first wiring) Vrstn and a read-out control wire Vrdn, which are two kinds of sensor scan signal lines E (see FIG. 9). The storage capacitance wire Csn, the reset wire Vrstn, and the read-out control wire Vrdn are provided in parallel with the gate wire Gn.

The picture unit PIX includes a TFT 11 as a switching element, a liquid crystal capacitance CL, and a storage capacitance CS. A gate of the TFT 11 is connected to the gate wire Gn, a source of the TFT 11 is connected to a source wire S, and a drain of the TFT 11 is connected to a picture unit electrode 13, respectively. The liquid crystal capacitance CL is a capacitance in which a liquid crystal layer is interposed between the picture unit electrode 13 and the common electrode "com," and the storage capacitance CS is a capacitance in which an insulating film is interposed between the picture unit electrode 13 or a drain electrode of the TFT 11 and the storage capacitance wire Csn. A fixed voltage is applied to the common electrode "com" and the storage capacitance wire Csn, respectively, for example.

An appropriate number of the touch sensor circuits 62 are provided such as one touch sensor circuit 62 per a picture unit PIX or a pixel (a set of RGB picture units PIX . . . , for example), and the touch sensor circuit 62 includes a first circuit including TFTs 62a and 62b as well as an electrode 62c. Here, the first circuit itself constitutes the touch sensor circuit 62. A gate terminal of the TFT (switch) 62a is connected to the read-out control wire Vrdn, one of the drain/source terminals is connected to a source wire Sm, which is one of the source wires S, that is, the sensor output wire Vo, and the other one of the drain/source terminals is connected to a source of the TFT 62b, respectively. Moreover, a gate terminal of the TFT 62b is connected to the reset wire Vrstn, a drain terminal (first drain/source terminal) of the TFT 62b is connected to a source wire Sm+1, which is one of the source wires S, that is, a sensor power supply wire Vsm, and a source terminal (second drain/source terminal) of the TFT 62b is connected to the above-mentioned other one of drain/source terminals of the TFT 62a.

The electrode (first electrode) 62c is provided on the back channel side of the TFT 62b so as to be spaced from the TFT 62b, and functions as a back gate electrode of the TFT 62b. The electrode 62c is connected to the common electrode "com." As described below, common features of a field effect transistor are used for the TFT 62b. However, leakage current is especially prominent in the TFT.

Moreover, the touch sensor circuit 62 may further include an element other than the ones described above.

The touch sensor circuit 62 of the configuration shown in FIG. 2 uses a period outside the period for writing data signals to picture units PIX, that is, a horizontal blanking period, for example, to control whether to turn on or off the TFT 62b based on the existence of a displacement Δx at the electrode 62c according to the existence of a pressing force on the opposite substrate, and to output sensor output signals Vo from the TFT 62a to the sensor output wire Vom. Then, the existence of a pressing force on a display surface is detected based on sensor output signals Vo taken by the sensor read-out circuit 55 through the sensor output wire Vom.

Figure 4:
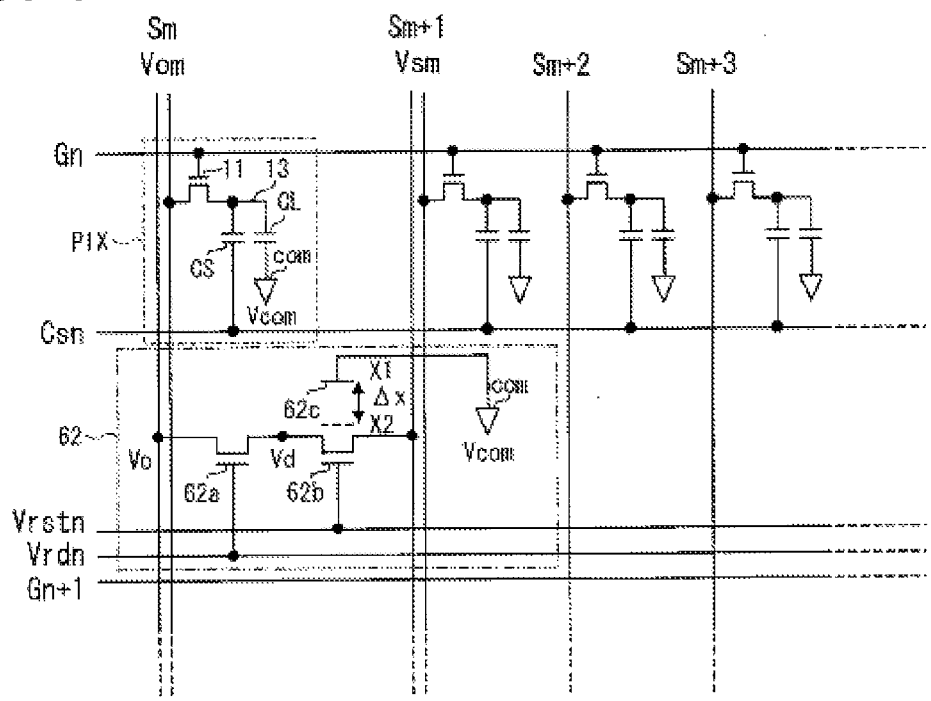
FIG. 4 is a circuit diagram showing the configuration of a modified example of the touch sensor circuit shown in FIG. 1.

The touch sensor circuit 62 may also have a configuration shown in FIG. 4.

In FIG. 4, the sensor output wire Vom and the sensor power supply wire Vsm are respectively provided, as wires independent from the source wires S. The first drain/source terminal of the TFT 62a is connected to the sensor output wire Vom, and the first drain/source terminal of the TFT 62b is connected to the sensor power supply wire Vsm.

Figure 1:
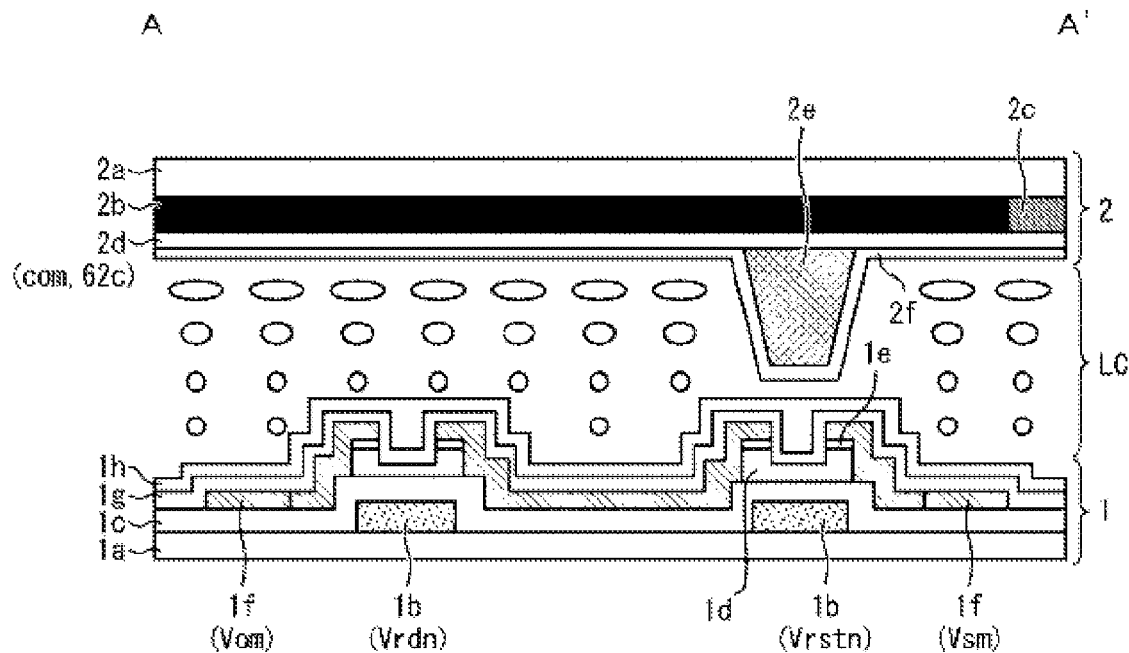
FIG. 1 shows an embodiment of the present invention, and is a cross-sectional view showing the configuration of a touch sensor circuit included in a display device.
Figure 5:
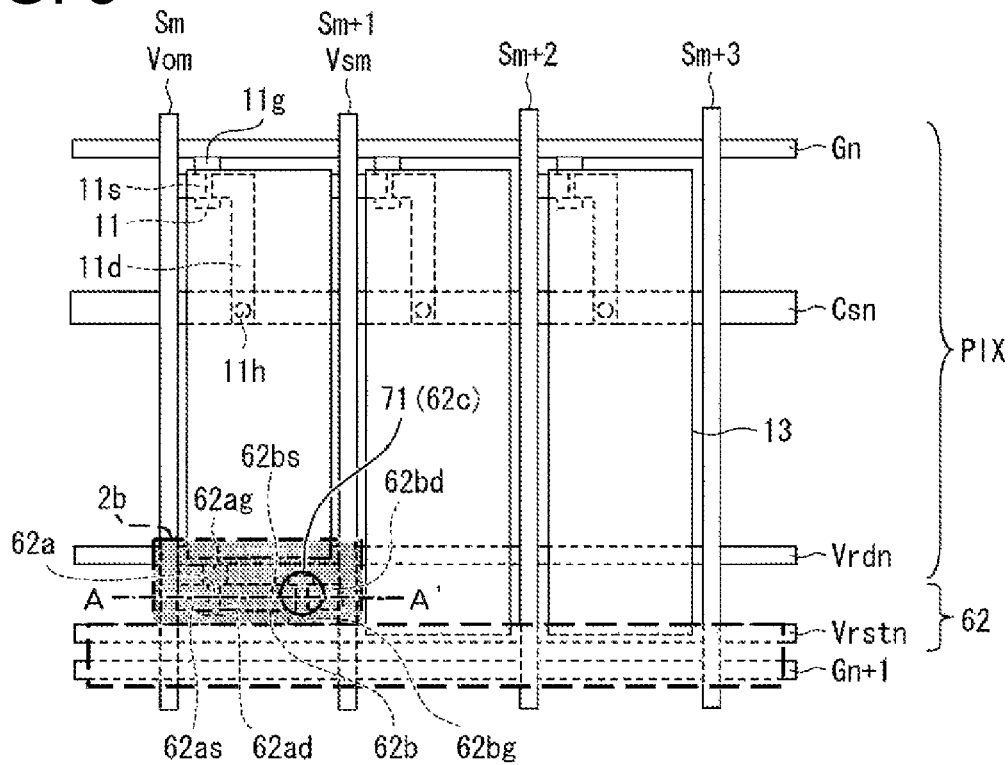
FIG. 5 is a plan view showing a pattern arrangement of the display region shown in FIG. 2.

Next, a plan view of the touch sensor circuit 62 of FIG. 2 is shown in FIG. 5, and a cross-sectional view along the line A-A' of FIG. 5 is shown in FIG. 1.

As shown in FIG. 5, in a picture unit PIX, a gate 11g of the TFT 11 is connected to the gate wire Gn, a source 11s is connected to a source wire S (Sm, Sm+1, and Sm+2), a drain 11d is connected to the picture unit electrode 13 through a contact hole 11h, which is formed above the storage capacitance wire Csn, and forms a storage capacitance CS with the storage capacitance wire Csn.

Further, in the touch sensor circuit 62, the gate terminal of the TFT 62a is connected to the read-out control wire Vrdn, one of the drain/source terminals 62as is connected to the sensor output wire Vom, and the other one of drain/source terminal 62ad is connected to a source terminal 62bs of the TFT 62b, respectively. A gate terminal 62bg of the TFT 62b is connected to the reset wire Vrstn, and a drain terminal 62bd is connected to the sensor power supply wire Vsm, respectively.

Further, a columnar projection 71 is formed on the upper side of the TFT 62b, and this columnar projection 71 is formed on the electrode 62c. Moreover, in a region where the TFTs 62a and 62b are formed, that is, a region between the sensor output wire Vom and the sensor power supply wire Vsm that are adjacent to each other, and also between the read-out control wire Vrdn and the reset wire Vrstn that are adjacent to each other, a light-shielding film (black matrix) 2b for blocking light emitted from a display surface side is formed.

As shown in FIG. 1, a cross-sectional configuration of the region where the touch sensor circuit 62 is formed is the configuration in which a liquid crystal layer LC is interposed between a TFT substrate 1 and an opposite substrate 2, similarly to the region of the picture unit PIX.

The TFT substrate (second substrate) 1 has a configuration of sequentially laminating an insulating substrate 1a, a gate metal 1b, a gate insulating film 1c, an Si i-layer 1d, an Si n+-layer 1e, a source metal 1f, a passivation film 1g, and a liquid crystal alignment film 1h. The read-out control wire Vrdn and the reset wire Vrstn are formed of the gate metal 1b in a manner similar to the gate wire Gn and the storage capacitance wire Csn. The sensor output wire Vom and the sensor power supply wire Vsm are formed of the source metal if in a manner similar to the source wire S. The alignment film 1h is formed of polyimide, for example.

The opposite substrate (first substrate) 2 has a configuration of sequentially laminating an insulating substrate 2a, a light-shielding film 2b as well as color filters 2c, a transparent electrode 2d, a columnar projection 2e, and a liquid crystal alignment film 2f. The transparent electrode 2d constitutes the common electrode "com," and the electrode 62c is not distinguished from the common electrode "com" here because the electrode 62c is composed of the common electrode "com" itself. The electrode 62c is generally in a state of being connected to the common electrode "com," which state includes the configuration explained here.

The columnar projection 2e is made of a dielectric body, and is formed on the common electrode 2d so as to protrude from the back channel side of the TFT 62b of the opposite substrate 2 toward the TFT substrate 1. The alignment film 2f located at the tip side of the columnar projection 2e is spaced from the TFT substrate 1 when no pressing force is applied on the opposite substrate 2 by a user's finger or the like, and it is capable of moving to a position that contacts the TFT substrate 1 when a pressing force is applied on the opposite substrate 2 by a user's finger or the like. This displacement of the opposite substrate 2 when a pressing force is applied is Δx in FIGS. 2 and 4. The opposite substrate 2 is located at a position X1 when no pressing force is applied, and moves to and stops at a position X2 when a pressing force is applied.

Figure 3:
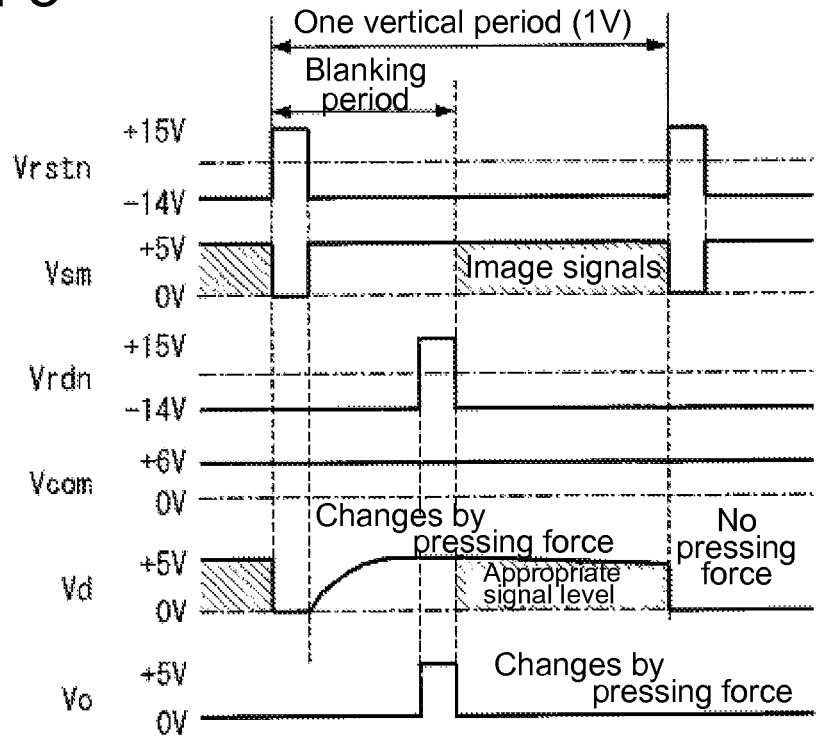
FIG. 3 is a waveform chart showing a behavior of the touch sensor circuit shown in FIG. 1.
Figure 7:
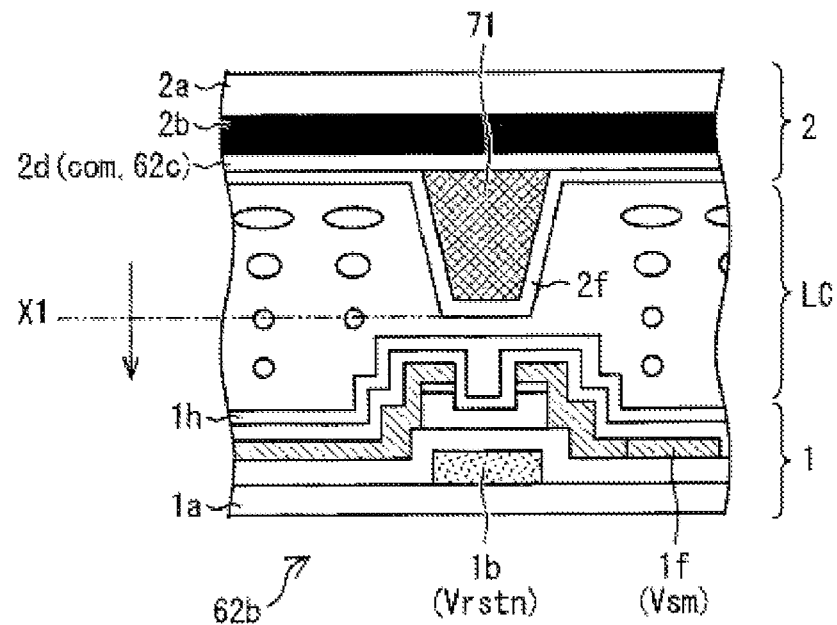
FIG. 7 is a view showing the configuration of the touch sensor circuit, and FIG. 7($a$) is a cross-sectional view showing the configuration of the touch sensor circuit when no pressing force is applied, and FIG. 7($b$) is a circuit diagram showing the state of FIG. 7($a$) in an equivalent circuit.
Figure 7:
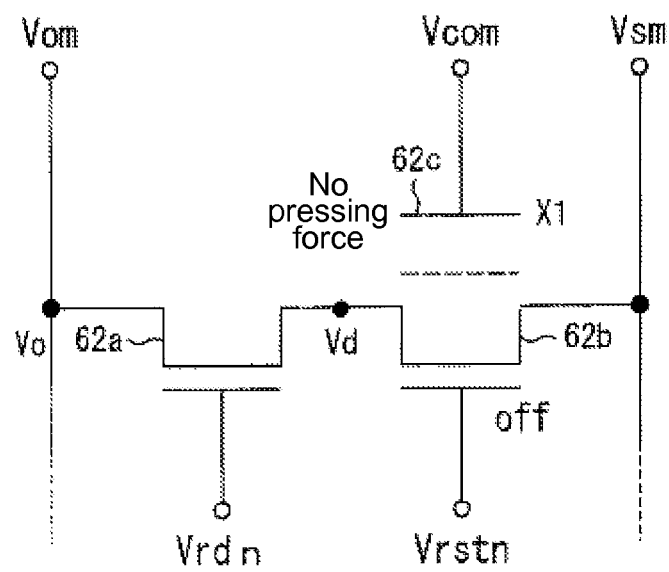
Figure 8:
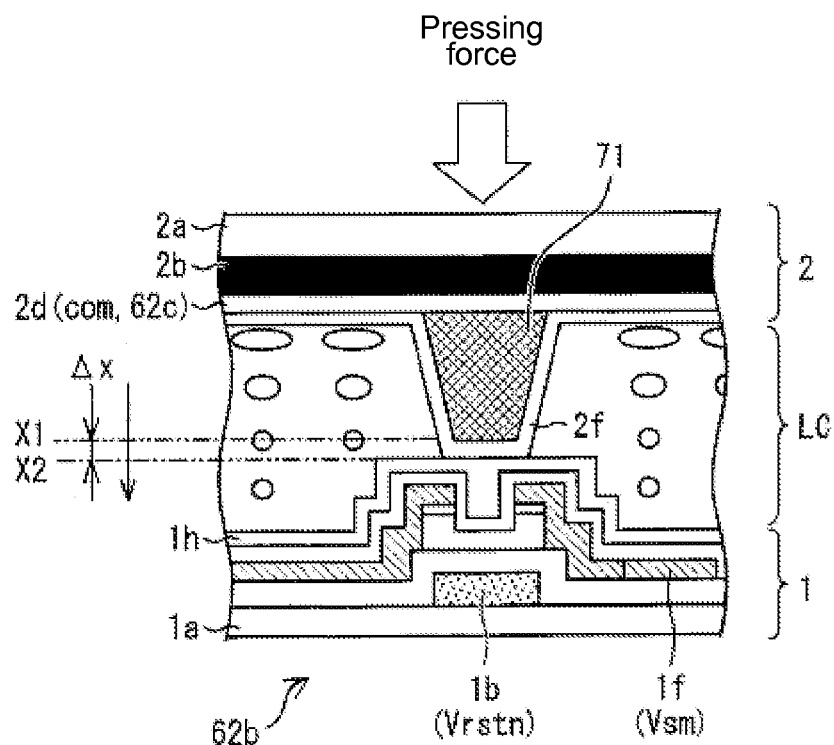
FIG. 8 is a view showing the configuration of the touch sensor circuit, and FIG. 8($a$) is a cross-sectional view showing the configuration of the touch sensor circuit when a pressing force is applied, and FIG. 8($b$) is a circuit diagram showing the state of FIG. 8($a$) in an equivalent circuit.
Figure 8:
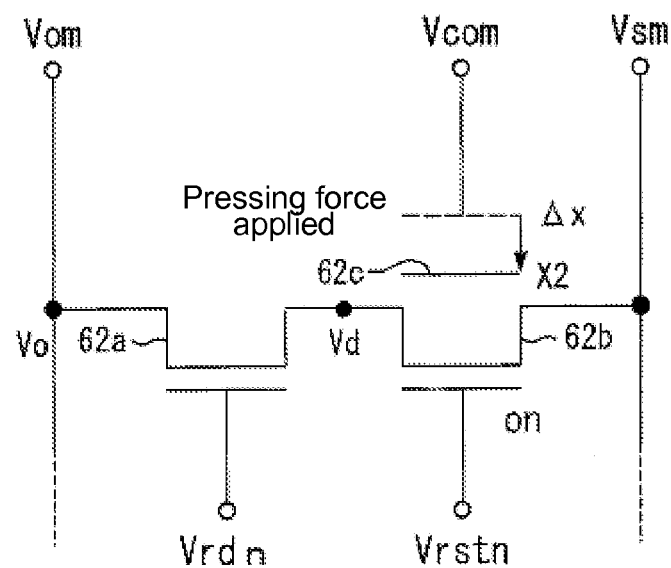

Next, the behavior of the touch sensor circuit 62 is described using FIGS. 3, 7, and 8.

As shown in the waveform chart of FIG. 3, the touch sensor circuit 62 of each row is driven by applying a High+15V and Low-14V positive reset pulse to the reset wire Vrstn, and by applying a High+15V and Low-14V positive read-out pulse to the read-out control wire Vrdn for each vertical period (1V). The read-out pulse is applied after the elapse of a prescribed time after the application of the reset pulse. Further, a power supply voltage of 0V is applied to the sensor power supply wire Vsm during the same period as the reset pulse. The power supply voltage changes to +5V at the same time the reset pulse falls. When each sensor output wire Vom is used to detect one corresponding pressed region on one screen, for example, the beginning of the reset pulse application to the end of the read-out pulse application can be set in a blanking period of one vertical period at once without scanning each row. Further, the beginning of the reset pulse application to the end of the read-out pulse application may also be set outside the image signal writing period of each horizontal period by scanning each row, for example. In this case, when there are sensor output wires Vom, which are used to detect a plurality of corresponding pressed regions on one screen, it becomes possible to detect a pressing force on respective pressed regions. Alternatively, one row may be scanned at a time in one blanking period of one vertical period to detect a pressing force of more than one pressed regions within a certain time period.

The back channel of the TFT 62b is covered by a passivation film such as SiNx having a film thickness of several thousand angstrom, but because of the back gate effect of a voltage applied to the electrode 62c, it is possible to induce leakage current to the back channel. The size of the leakage current, that is, the size of the back gate effect, is controlled by a distance between the electrode 62c and the TFT 62b.

As shown in FIG. 7(a), when no pressing force is applied on the display surface of the opposite substrate 2, even though a reset pulse is applied to the reset wire Vrstn, the electrode 62c remains at the position X1, and the alignment film 2f at the tip side of the columnar projection 71 is spaced from the TFT substrate 1 (here from the alignment film 1h). Accordingly, as shown in FIG. 7(b), the back gate effect by the electrode 62c is small, and even though the TFT 62b is turned off, the leakage current is not generated in the back channel. As a result, the TFT 62b sufficiently becomes an OFF state. Thus, a voltage Vd of the source of the TFT 62b remains 0V, which is an initial value, even after the application of a reset pulse was finished and a power supply voltage of the sensor power supply wire Vsm rose to +5V, as shown in FIG. 3. Accordingly, even when a read-out pulse is applied after the application of a reset pulse is finished, and the TFT 62a becomes an ON state, the voltage of the sensor power supply wire Vsm is not transmitted to the sensor output wire Vom, and the sensor output voltage Vo becomes 0V.

On the other hand, in a state where a pressing force is applied on the display surface of the opposite substrate 2, when a reset pulse is applied to the reset wire Vrstn, as shown in FIG. 8(a), the electrode 62c moves to the position X2, which is displaced from the position X1 by Δx, and the alignment film 2f at the tip side of the columnar projection 71 becomes in contact with the TFT substrate 1 (here from the alignment film 1h). Therefore, as shown in FIG. 8(b), the back gate effect by the electrode 62c is large, and the leakage current is generated in the back channel of the TFT 62b. Accordingly, as shown in FIG. 3, the voltage Vd of the source of the TFT 62b increases after the application of the reset pulse was finished and when the power supply voltage of the sensor power supply wire Vsm rose to +5V. The size of an increase of the voltage Vd depends on Δx, but here, because the electrode 62c is designed to stop at the position X2 when a pressing force is applied, the same voltage value is always reached. Then, once a read-out pulse is applied after the elapse of a prescribed time, and the TFT 62a becomes an ON state, the sensor output voltage Vo becomes approximately the value of the voltage Vd at that time, in other words, the voltage of the sensor power supply wire Vsm is transmitted to the sensor output wire Vom.

Accordingly, it is possible to detect the existence of a pressing force on the display surface by detecting the sensor output voltage Vo by the sensor read-out circuit 55.

Further, during the image data writing period, according to the configuration of FIG. 2, image signals are supplied to the sensor power supply wire Vsm, that is, the source wire Sm+1, and the sensor power supply wire Vsm becomes an appropriate voltage in accordance with the image signals.

According to the configuration of the touch sensor circuit 62, even though the electrode 62c does not come in electrical contact with the TFT substrate 1 by a pressing force, it is possible to obtain detection signals based on the existence of the pressing force. Because a movable electrical contact point is not necessary to detect a pressing force, there is no need to push with a strong force, and as a result, it is possible to avoid a peel-off of the inside of the touch sensor circuit 62. Therefore, a touch sensor circuit with superior durability is achieved.

Further, because a photo sensor is not used to detect a pressing force, there is no problem such as a malfunction in a high illuminance environment and a low illuminance environment, unlike a photo sensor circuit. Moreover, unlike a capacitance type touch sensor, there is no site in which a malfunction is likely to occur due to an external cause such as temperature change and static electricity, and therefore, detection with a high S/N ratio becomes possible.

As a result, it is possible to achieve a display device including a non-contact type touch sensor having excellent properties, which can replace a contact-point type touch sensor.

Furthermore, because a current flowing to the TFT 62b can be set large, the element size of the TFT 62b and the TFT 62a can be reduced. Accordingly, a voltage for generating detection signals can be reduced while increasing the aperture ratio of the display region.

Also, unlike a photo sensor circuit, a large capacitance for increasing voltage is not necessary, and therefore, the process is simplified and the aperture ratio of the display region can be increased.

Moreover, according to the touch sensor circuit 62, the electrode 62c is connected to the common electrode "com," and therefore, it is possible to easily constitute the electrode 62c, which is displaced along with the opposite substrate 2 by an applied pressing force. Further, because the electrode 62c can be formed at the same time the common electrode "com" is formed, the process is simplified. Also, a common voltage Vcom can be used as a voltage to be applied to the electrode 62c so that the circuit can be simplified.

Further, according to the touch sensor circuit 62, the columnar projection 71 made of a dielectric body is formed on the electrode 62c. This way, even though an intermediary such as a liquid crystal layer LC or a space exists between the TFT substrate 1 and the opposite substrate 2, the electrode 62c can function as the back gate of the TFT 62b. Accordingly, the sensibility of detecting an applied pressing force can be improved. The columnar projection 71 may also be other than the ones made of a dielectric body; a columnar projection made of a conductive body or a columnar projection in which a surface of a dielectric body is covered by a conductive body can be used alternatively.

The tip side of the columnar projection 71 is spaced from the TFT substrate 1 when no pressing force is applied on the opposite substrate 2, and it is capable of moving to a position that contacts the TFT substrate 1 when a pressing force is applied on the opposite substrate 2. Accordingly, it is possible to stably achieve two different states, which are a state with no applied pressing force where the position of the columnar projection 71 does not change and a state where a pressing force is applied and the tip side of the columnar projection 71 comes in contact with and stops at the TFT substrate 1. Therefore, a malfunction in detecting an applied pressing force is not likely to occur.

Moreover, the touch sensor circuit 62 is provided in the display region, and therefore, a plurality of the touch sensor circuits 62 can be disposed within the display matrix. This enables multiple point inputs, which have been heavily-demanded, to be accommodated as well by taking advantage of the superior characteristics against malfunction.

In the touch sensor circuit 62 of FIG. 2, source wires S are used for the sensor power supply wire Vsm and the sensor output wire Vom, and in a period outside the period for writing data to picture units PIX, the source wires S are used as the sensor power supply wire Vsm and the sensor output wire Vom. As a result, the number of wires can be reduced, and therefore, the aperture ratio of the display region can be improved.

In the touch sensor circuit 62 of FIG. 4, wires independent of the source wires S are used for the sensor power supply wire Vsm and the sensor output wire Vom. According to this configuration, the sensor power supply wire Vsm and the sensor output wire Vom can be used to drive the touch sensor circuit 62 whether or not it is the period for writing data to picture units PIX, and therefore, a pressing force can be detected at a highly flexible timing.

Further, according to the touch sensor circuit 62, the liquid crystal layer LC is interposed between the region of opposite substrate 2 where the electrode 62c is formed, and the region of the TFT substrate 1 where the TFT 62b is formed. Thus, in a liquid crystal display device 1, the liquid crystal layer LC for creating picture units PIX can be directly used to constitute the region of the touch sensor circuit 62.

According to the touch sensor circuit 62, a liquid crystal alignment film (1h, 2f) is formed on at least one of the region of the opposite substrate 2 where the electrode 62c is formed and the region of the TFT substrate 1 where the TFT 62b is formed. Accordingly, the alignment film for creating picture units PIX can be directly used for the region of the touch sensor circuit 62 without breaking it.

Moreover, according to the touch sensor circuit 62 of FIG. 5, the light-shielding film 2b is provided, and therefore, it is possible to effectively prevent the touch sensor circuit 62 from malfunctioning due to an external light, and the stability of detecting a pressing force is further improved.

Figure 6:
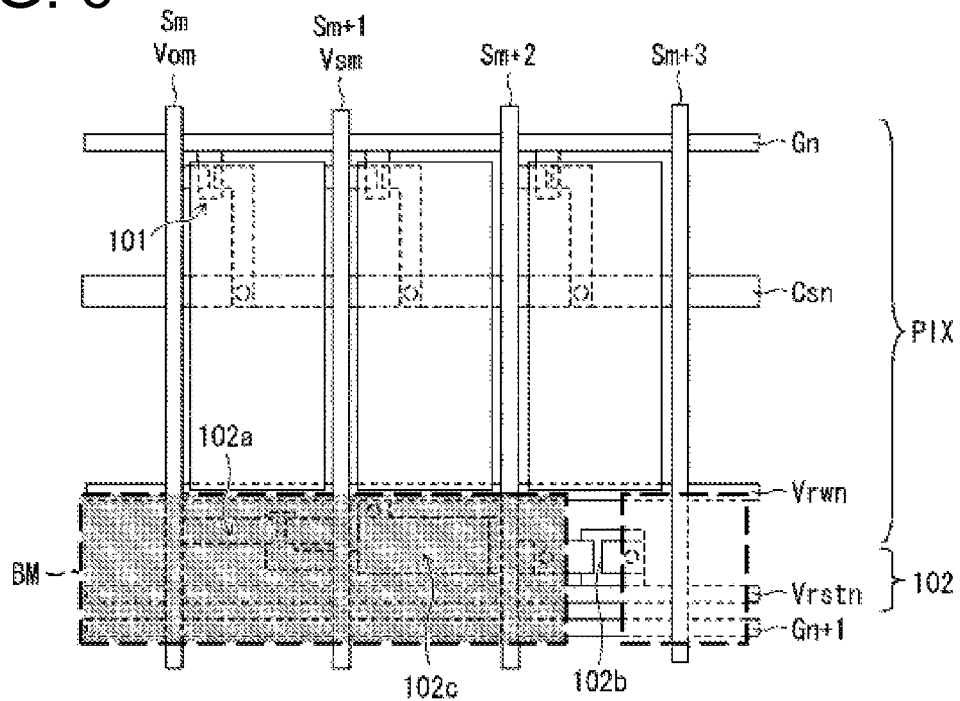
FIG. 6 is a plan view showing a pattern arrangement of a display region as a comparative example of FIG. 5.
Figure 10:
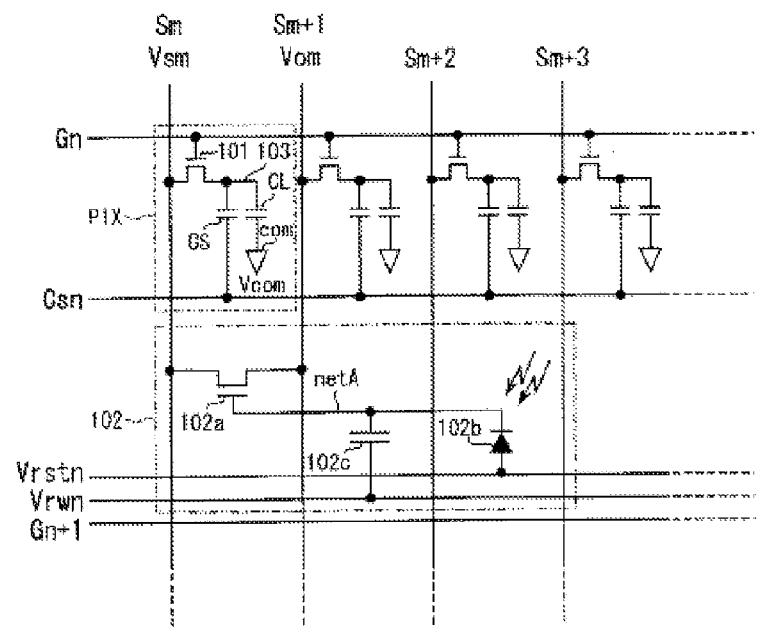
FIG. 10 shows a conventional technology, and is a circuit diagram showing the configuration of a display region including a photo sensor type touch sensor.
Figure 11:
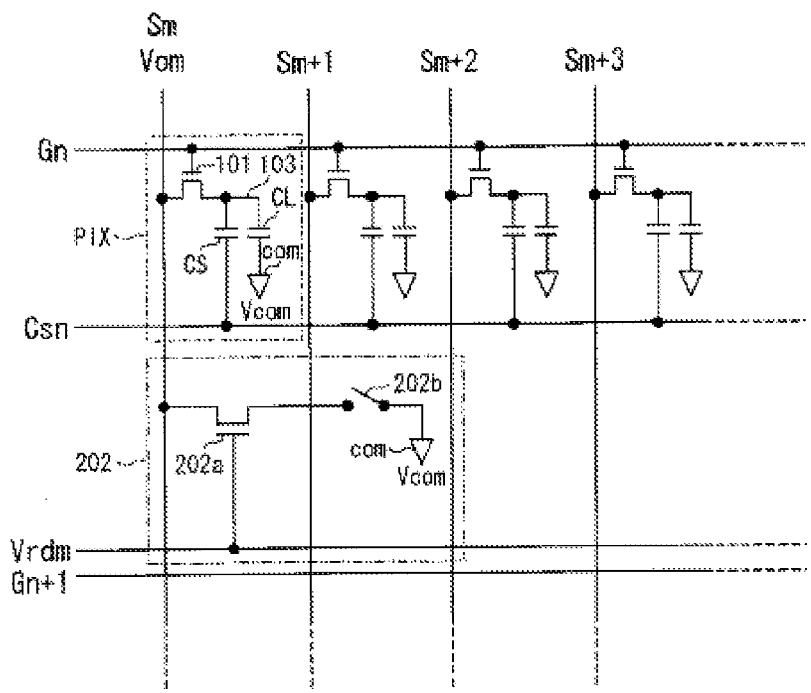
FIG. 11 shows a conventional technology, and is a circuit diagram showing the configuration of a display region including a contact-point type touch sensor.
Figure 12:
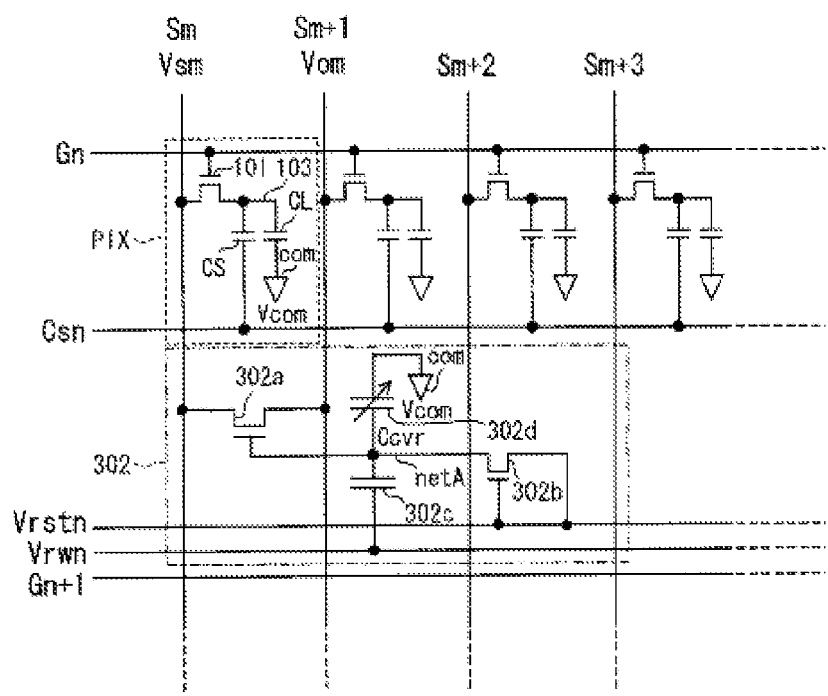
FIG. 12 shows a conventional technology, and is a circuit diagram showing the configuration of a display region including a capacitance type touch sensor.
Figure 13:
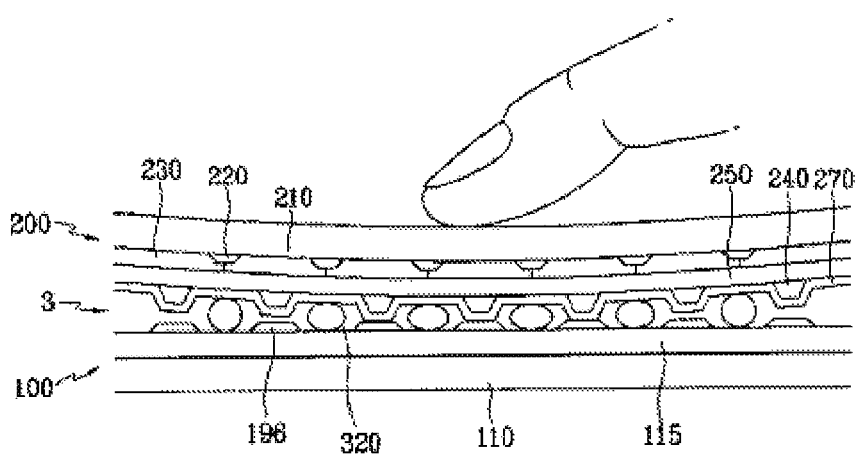
FIG. 13 shows a conventional technology, and is a cross-sectional view showing a configuration example of the display device including a contact-point type touch sensor.

Here, for comparison, FIG. 6 shows a plan view of a display region having a photo sensor circuit 102 of FIG. 10 described in the conventional technology. In FIG. 6, in order to prevent a malfunction of the photo sensor circuit 102 due to excessive light irradiation, a light-shielding film BM is formed across a broad region where the output amp 102a and the capacitance 102c are formed.

Meanwhile, in the touch sensor circuit 62 of FIG. 5, because the size of an area where the touch sensor circuit 62 occupies can be reduced, it is possible to decrease the reduction in the aperture ratio of the display region due to the light-shielding film 2b.

The embodiments of the present invention have been described above.

In order to resolve the above-mentioned problem, the display device of the present invention is equipped with a first circuit including:

a first electrode formed on a first substrate having a display surface of a display panel;

a field effect transistor formed on a second substrate opposed to the first substrate so that the first electrode is spaced from the field effect transistor on a back channel side, a gate terminal being connected to a first wiring, and a first drain/source terminal being connected to a second wiring; and a switch, one end of which is connected to a second drain/source terminal of the field effect transistor, and the other end is connected to a third wiring.

According to the above-mentioned invention, when no pressing force is applied on the display surface of the first substrate, even though a certain voltage is applied to the first wiring, the first electrode is located in a position far from the second substrate. Here, the back gate effect on the field effect transistor by the first electrode is small, and it is possible to turn off the field effect transistor and to prevent leakage current from being generated in the back channel. Accordingly, even though the switch is turned on, a voltage of the second wiring is not transmitted to the third wiring.

On the other hand, in a state where a pressing force is applied on the display surface of the first substrate, when the above-mentioned certain voltage is applied to the first wiring, the first electrode is moved to a position close to the second substrate. Here, the back gate effect by the first electrode is large, and it is possible to generate leakage current in the back channel of the field effect transistor. Thus, a voltage of the source of the field effect transistor is increased. Therefore, when the switch is turned on after the field effect transistor is sufficiently turned off, the voltage of the source of the field effect transistor is transmitted to the third wiring; that is, the voltage of the second wiring is transmitted to the third wiring.

Accordingly, the existence of a pressing force on the display surface can be detected by detecting the voltage transmitted to the third wiring.

According to the above-mentioned configuration of the first circuit, even though the first electrode does not come in electrical contact with the second substrate by a pressing force, detection signals according to the existence of the pressing force can be obtained. Because a movable electrical contact point is not necessary to detect a pressing force, there is no need to push with a strong force, and as a result, it is possible to avoid a peel-off of the inside of the sensor circuit. Therefore, a touch sensor circuit with superior durability is achieved.

Further, because a photo sensor is not used to detect a pressing force, there is no problem such as a malfunction in a high illuminance environment and a low illuminance environment, unlike a photo sensor circuit. Moreover, unlike a capacitance type touch sensor, there is no site in which a malfunction is likely to occur due to an external cause such as temperature change and static electricity, and therefore, detection with a high S/N ratio becomes possible.

As a result, it is possible to achieve a display device including a non-contact type touch sensor having excellent properties, which can replace a contact-point type touch sensor.

Further, because a current applied to the filed effect transistor can be set large, the element size of the field effect transistor and the switch can be reduced. Accordingly, a voltage for generating detection signals can be reduced while increasing the aperture ratio of the display region.

Moreover, unlike a photo sensor circuit, a large capacitance for increasing voltage is not necessary, and therefore, the process is simplified and the aperture ratio of the display region can be increased.

In a display device of the present invention, in order to resolve the above-mentioned problem, the first electrode is connected to the common electrode.

According to the above-mentioned invention, the first electrode is connected to the common electrode, and therefore, it is possible to easily constitute the first electrode that is displaced along with the first substrate due to an applied pressing force. Further, because the first electrode can be formed at the same time the common electrode is formed, the process is simplified. Also, the common voltage can be used as a voltage to be applied to the first electrode, and therefore, the circuit can be simplified.

In a display device of the present invention, in order to resolve the above-mentioned problem, a columnar projection, which is made of a dielectric body, a conductive body, or a dielectric body in which a surface thereof is covered by a conductive body, and which is formed on the first electrode so as to protrude from a back channel side of the field effect transistor on the first substrate toward the second substrate, is formed such that the first substrate is in no contact with the second substrate when no pressing force is applied on the first substrate.

According to the above-mentioned invention, a columnar projection, which is made of a dielectric body, a conductive body, or a dielectric body in which a surface thereof is covered by a conductive body, is provided, and therefore, even though an intermediary or a space exists between the first substrate and the second substrate, the first electrode can function as a back gate of the field effect transistor. Accordingly, the sensibility of detecting a pressing force can be improved.

In a display device of the present invention, in order to resolve the above-mentioned problem, a tip side of the columnar projection is spaced from the second substrate when no pressing force is applied on the first substrate, and is capable of moving to a position that contacts the second substrate when a pressing force is applied on the first substrate.

According to the above-mentioned invention, a columnar projection, which is made of a dielectric body, a conductive body, or a dielectric body in which a surface thereof is covered by a conductive body, is provided, and therefore, it is possible to stably achieve two different states, which are a state with no pressing force applied where the position of the columnar projection does not change and a state where a pressing force is applied and the tip side of the columnar projection comes in contact with and stops at the second substrate. Therefore, a malfunction in detecting an applied pressing force is not likely to occur.

In a display device of the present invention, in order to resolve the above-mentioned problem, the first circuit is provided in a display region.

According to the above-mentioned invention, a plurality of the first circuits can be arranged in a display matrix. Further, this enables a multiple point input to be accommodated as well by taking advantage of the superior characteristics against malfunction.

In a display device of the present invention, in order to resolve the above-mentioned problem, a data signal line is used for the second wiring.

According to the above-mentioned invention, in a period outside the period for writing data to picture units, the data signal line is used for the second wiring, and therefore, the number of wires can be reduced, and the aperture ratio of the display region can be increased.

In a display device of the present invention, in order to resolve the above-mentioned problem, a wire independent of a data signal line is used for the second wiring.

According to the above-mentioned invention, the second wiring can be used to drive the first circuit whether or not it is in the period for writing data to picture units, and therefore, a pressing force can be detected at a highly flexible timing.

In a display device of the present invention, in order to resolve the above-mentioned problem, a data signal line is used for the third wiring.

According to the above-mentioned invention, in a period outside the period for writing data to picture units, the data signal line is used for the third wiring, and therefore, the number of wires can be reduced, and the aperture ratio of the display region can be increased.

In a display device of the present invention, in order to resolve the above-mentioned problem, a wire independent of a data signal line is used for the third wiring.

According to the above-mentioned invention, the third wiring can be used to drive the first circuit whether or not it is the period for writing data to picture units, and therefore, a pressing force can be detected at a highly flexible timing.

In a display device of the present invention, in order to resolve the above-mentioned problem, a liquid crystal layer is interposed between a region of the first substrate where the first electrode is formed, and a region of the second substrate where the field effect transistor is formed.

According to the above-mentioned invention, in a liquid crystal display device, the liquid crystal layer for creating picture units can be directly used to constitute the region of the first circuit.

In a display device of the present invention, in order to resolve the above-mentioned problem, a liquid crystal alignment film is formed on at least one of a region of the first substrate where the first electrode is formed and a region of the second substrate where the field effect transistor is formed.

According to the above-mentioned invention, an alignment film for creating picture units can be directly used for the region of the first circuit without breaking it.

In a display device of the present invention, in order to resolve the above-mentioned problem, a light-shielding film for the field effect transistor is provided.

According to the above-mentioned invention, because a light-shielding film is provided, it is possible to effectively prevent the first circuit from malfunctioning due to an external light, and the stability of detecting a pressing force is further improved. Further, because the area where the first circuit occupies can be reduced, it is possible to decrease the reduction in the aperture ratio of the display region because of the light-shielding film.

In a display device of the present invention, in order to resolve the above-mentioned problem, whether or not a pressing force is applied on the first substrate is detected by detecting whether or not a voltage of the second wiring is transmitted to the third wiring through the field effect transistor based on an output of the first circuit, which is obtained through the third wiring in a state where the switch is closed.

According to the above-mentioned invention, it is possible to easily detect the existence of a pressing force with certainty.

The present invention is not limited to the above-mentioned respective embodiments. These embodiments may be combined, and various modifications are possible within the scope of the claims. That is, an embodiment that can be obtained by combining technical measures, which have been appropriately modified within the scope of the claims, is also included in the technical scope of the present invention.

Industrial Applicability

The present invention can be preferably used for various display devices including a liquid crystal display device.

Description of Reference Characters

1 TFT substrate (second substrate)
2 Opposite substrate (first substrate)
1h Alignment film
2b Light-shielding film
2f Alignment film
50 Liquid crystal display device (display device)
51 Display panel
62 Touch sensor circuit (first circuit)
62a TFT (switch)
62b TFT (field effect transistor)
62bg Gate terminal
62bd Drain terminal (first drain/source terminal)
62bs Source terminal (second drain/source terminal)
62c Electrode (first electrode)
71 Columnar projection
com Common electrode
LC Liquid crystal layer
Vrst, Vrstn Reset wires (first wiring lines)
Vs, Vsm Sensor power supply wires (second wiring lines)
Vo, Vom Sensor output wires (third wiring lines)

The invention claimed is:

1. A display device comprises a first circuit including:
   a first electrode formed on a first substrate having a display surface of a display panel;
   a field effect transistor formed on a second substrate opposed to said first substrate so that said first electrode is spaced from the field effect transistor on a back channel side, a gate terminal being connected to a first wiring, and a first drain/source terminal being connected to a second wiring; and
   a switch, one end thereof being connected to a second drain/source terminal of said field effect transistor, and the other end being connected to a third wiring,
   wherein a data signal line is used for said third wiring.

2. The display device according to claim 1, wherein said first electrode is connected to a common electrode.

3. The display device according to claim 1, wherein a columnar projection, which is made of a dielectric body, a conductive body, or a dielectric body in which a surface thereof is covered by a conductive body, and which is formed on said first electrode so as to protrude from a back channel side of said field effect transistor on said first substrate toward said second substrate, is formed such that said first substrate is not in contact with said second substrate when no pressing force is applied on said first substrate.

4. The display device according to claim 3, wherein a tip side of said columnar projection is spaced from said second substrate when no pressing force is applied on said first substrate, and is capable of moving to a position that contacts said second substrate when a pressing force is applied on said first substrate.

5. The display device according to claim 1, wherein said first circuit is provided in a display region.

6. The display device according to claim 1, wherein a data signal line is used for said second wiring.

7. The display device according to claim 1, wherein a wire independent of a data signal line is used for said second wiring.

8. The display device according to claim 1, wherein a liquid crystal layer is interposed between a region of said first substrate where said first electrode is formed and a region of said second substrate where said field effect transistor is formed.

9. The display device according to claim 8, wherein a liquid crystal alignment film is formed on at least one of a region of first substrate where said first electrode is formed and a region of said second substrate where said field effect transistor is formed.

10. The display device according to claim 1, wherein a light-shielding film for said field effect transistor is provided.

11. The display device according to claim 1, wherein whether or not a pressing force is applied on said first substrate is detected by detecting whether or not a voltage of said second wiring is transmitted to said third wiring through said field effect transistor based on an output of said first circuit, which is obtained through said third wiring in a state where said switch is closed.

* * * * *